United States Patent Office 3,595,827
Patented July 27, 1971

3,595,827
ETHYLENE INTERPOLYMERS HAVING IMPROVED SLIP AND ANTI-BLOCKING PROPERTIES
George N. Foster, Somerville, N.J., assignor to Union Carbide Corporation, New York, N.Y.
No Drawing. Continuation-in-part of application Ser. No. 843,760, July 22, 1969. This application Nov. 26, 1969, Ser. No. 880,363
Int. Cl. C08f 45/44, 45/04
U.S. Cl. 260—32.6
10 Claims

ABSTRACT OF THE DISCLOSURE

The slip and anti-blocking properties of ethylene interpolymers have been improved by incorporating therein from about 0.02 to 1.0% by weight of amphipathic secondary fatty acid amides containing from about 20 to 24 carbon atoms and in which the nitrogen atom is substituted with a saturated hydrocarbon radical having from 14 to 26 carbon atoms and 0.01 to about 2.0% by weight of synthetic amorphous silica having a surface area of about 175 to 400 meters$^2$/g., a pore size of about 80–250 A., and an average particle size of about 0.5 to 8.0 microns.

BACKGROUND OF THE INVENTION

This is a continuation-in-part of application Ser. No. 843,760, filed July 22, 1969, now abandoned.

This invention relates to ethylene interpolymers and in particular to the improvement of the slip and anti-blocking properties of these interpolymers. This invention is more particularly related to carboxyl-containing ethylene interpolymers, their alkali metal, alkaline earth or zinc ionomer salts, and ethylene-vinyl acetate interpolymers.

The ethylene interpolymers enumerated above can be fabricated to films having excellent physical properties. However, exploitation of their full commercial potential has been hampered by their poor slip and anti-blocking properties. Although many materials have been used in the past for the improvement of slip properties of various polymer films they often effect no improvement in anti-blocking properties. This necessitates the addition of a second additive which is undesirable because the formulation process is more complicated and other film properties may be adversely affected such as haze, gloss, odor, taste and feel as well as plating out problems when extrusion equipment is used.

SUMMARY OF THE INVENTION

It has now been found that both the slip and anti-blocking properties of the ethylene interpolymers of this invention can be improved by incorporating therein from about 0.02 to 1.0% by weight, based on the weight of the total polymer composition, of an amphipathic compound having the formula:

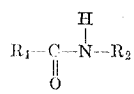

wherein $R_1$ is a mono-olefinically unsaturated hydrocarbon radical having 20 to 24 carbon atoms and $R_2$ is a saturated alkyl group having 14 to about 26 carbon atoms, and 0.01 to 2% by weight, based on the weight of the total polymer composition, of synthetic amorphous silica having a surface area of about 175 to 400 meters$^2$/g., a pore size of about 80–250 A., and an average particle size of about 0.5 to 8.0 microns.

DESCRIPTION OF THE INVENTION

The term "ethylene interpolymers" as employed in the description of this invention includes the carboxyl-containing interpolymer: ethylene-acrylic acid interpolymers, or ethylene-methacrylic acid interpolymers, inorganic salts of ethylene-acrylic or methacrylic acid interpolymers, and ethylene-vinyl acetate interpolymers.

The ethylene-acrylic or methacrylic acid interpolymers can contain from about 2 to 25% by weight of acrylic or methacrylic acid interpolymerized therein with about 3 to 20%, 7 to 18% and 8 to 11% being preferred ranges.

The melt index (as determined by the procedure delineated in ASTM D–1238–65T) can be as low as about 0.01 dg./min. or as high as about 350 dg./min. with preferred ranges being about 5 to 250 dg./min., 12 to 125 dg./min. and 5 to 50 dg./min.

The inorganic salts of these carboxyl-containing interpolymers have about 10 to 100% by weight of the acrylic acid or methacrylic acid moieties converted or neutralized to acrylate salt moieties containing alkali metal, alkaline earth metal or zinc cations. Examples of alkali metal interpolymer salts are those containing Na$^+$, K$^+$ or Li$^+$ cations. Examplary of alkaline earth metal interpolymer salts are those containing Ca$^{++}$, Ba$^{++}$, Sr$^{++}$ and like cations.

These interpolymer salts can be prepared by reacting ethylene-acrylic acid or methacrylic acid interpolymers with metal salts such as carbonates or bicarbonates; metal bases such as hydroxides or alkoxides; metal alkyls such as sodium ethyl, butyl lithium, and the like; metal aryls such as phenyl lithium, potassium naphthalene, and the like; hydrides of sodium, potassium or the like; oxides such as sodium peroxide, barium peroxide, zinc oxide, and the like; or in the case of alkali metal salts even with a free alkali metal itself.

The ethylene-acrylic acid interpolymers used in this invention can be made by the free radical, random interpolymerization of ethylene with either acrylic or methacrylic acids using methods well known in the art including bulk, solution, aqueous suspension, non-aqueous dispersion and emulsion techniques in either batch or continuous processes.

The ethylene-vinyl acetate interpolymers of this invention can contain about 0.5 to 20% by weight of vinyl acetate interpolymerized within with about 4 to 18% being a preferred range. Their melt index can lie in the range of about 0.06 to 20 dg./min. although about 0.2 to 4 dg./min. is preferred. These interpolymers are commercially available and methods of preparing them are well known in the art.

The preferred amphipathic compounds represented by the formula shown above include: behenyl erucamide, arachidyl erucamide, stearyl erucamide, palmityl erucamide and the like. It is particularly preferred to employ stearyl erucamide as the amphipathic compound of this invention. Other compounds which can be used include palmityl gadoleamide, palmityl cetoleamide, palmityl nervonamide, stearyl gadoleamide, stearyl cetoleamide, stearyl nervonamide, arachidyl gadoleamide, arachidyl cetoleamide, arachidyl nervonamide, lignoceryl gadoleamide, lignoceryl, cetoleamide, lignoceryl nervonamide, cerotyl gadoleamide, cerotyl cetoleamide, cerotyl nervonamide, behenyl gadoleamide, behenyl cetoleamide, behenyl nervonamide, and the like.

The term "Amphipathic," as described in "Introduction to Colloid Chemistry" by K. J. Mysels (interscience Publishing Co., N.Y.C., 1959) on pages 180–1, is used herein to mean a polar compound which is both hydrophilic and lyophilic.

Although a range of from about 0.02 to 1.0% by weight of the amphipathic compound based on the weight of the total composition, can be used in this invention it is preferred to use a range of about 0.1 to 1.0% or even 0.1 to 0.5%. The optimum amount of amphipathic compound varies with the particular ethylene interpolymer and is of course the smallest amount which will afford the desired slip and anti-blocking properties. This limitation is made more critical by the fact that as the concentration of amphipathic compound present increases so does the probability of gross surface crystallization of this additive which in turn causes an undesirable haze to develop in films prepared from the composition. The minimum amount of amphipathic compound which can be employed will vary with the amount of comonomer interpolymerized with ethylene in the interpolymers falling within the purview of this invention.

The amount of synthetic amorphous silica used can range from about 0.01 to 2.0% by weight of the total composition but preferably is in the range of about 0.05 to 0.5% by weight.

The silica which can be used with the above-described amphipathic compounds to achieve improved slip and anti-blocking properties is critical and must be synthetic amorphous silica (at least 99.0% $SiO_2$) having discrete particles, a surface area of about 175 to 400 meters$^2$/g., 80 to 250 A. in pore size and an average particle size of about 0.5 to 8 microns. The naturally occurring silicas including the crystalline forms quartz, tridymite and cristobalite as well as the amorphous forms cannot be used. The readily available diatomaceous earth is also ineffective as can be seen by the controls compared with the examples which follow. From these data it is apparent that this form of silica affords results unobtainable with most types of silica used under the generic title of "filler" for myriad purposes. The synthetic amorphous silica used in this invention can be prepared by the hydrolysis of silicon compounds such as silicon tetrachloride as delineated on page 692 of Inorganic Chemistry by T. Moeller, John Wiley & Sons, Inc., N.Y.C. 1952 which is incorporated herein by reference. Suitable silicas are available from commercial sources, as for example, those sold by Davison Chemical Division of W. R. Grace & Co. under the trademark Syloid.

The amphipathic compound and additives may be incorporated into the polymers of this invention by mixing techniques well known in the polymer art. Thus, for example, dry blending, melt extrusion, Banburying and the like can be employed. In a preferred method the polymer is extruded with amphipathic compound in a plasticizing extruder and then fed to a film processing extruder. The claimed compositions are particularly useful in the fabrication of blown film and biaxially oriented film but are adaptable to the fabrication of films made by other techniques such as flat extrusion, solvent casting, and the like.

Apparatus commercially available for preparing polymer films is suitable for the preparation of films from the compositions of this invention.

Slip properties are determined by the coefficient of friction test method described in ASTM D-1894-63. The values given are units of force determined at a specified time interval after the films were prepared. The values given for each film indicate the coefficient of friction (COF) obtained at the outside of each film since films were prepared by a tubular extrusion process from which the film is taken in tubular form, rolled in collapsed form and then slit into flat sheets prior to testing.

Blocking properties were determined in accordance with the procedure described in U.S. 3,028,355 (column 3, lines 50–69).

It will be readily appreciated by those skilled in the art that not all of the properties of each member of the class of ethylene copolymers treated in this invention are improved to the same degree. Thus for instance, the inorganic salts of carboxyl-containing ethylene polymers exhibit satisfactory slip and anti-blocking properties when blended with an amphipathic compound alone. But there is a further improvement in slip as well as anti-blocking properties when the silica of this invention is used in conjunction with one of these amphipathic compounds. While a film exhibiting a coefficient of friction in the range of about 0.1 to 0.3 will meet commercial acceptance obviously the lower this value is the better. It is also desirable that the lowest COF obtained be reached in the shortest time possible. The synthetic amorphous silica-amphipathic compound mixture used herein is also highly and uniquely effective in attaining this goal. While not wishing to be bound or limited to any one theoretical explanation it is proposed that this synthetic amorphous silica by virtue of its surface area and particle size fortuitously has physical dimensions which enable the amphipathic compound to reach the ethylene interpolymer surface at a rate greatly in excess of that resulting from diffusion. It is postulated that this silica functions by providing channels having a geometry and structure corresponding to the shape and morphology of the amphipathic compounds which facilitates the transportation of the latter. This interpretation would tend to account for the critical specificity of the physical requirements of the silica in this invention. Furthermore, notwithstanding the fact that amorphous silicas have been used in the past as slip additives, the synthetic amorphous silica of this invention has at best an insignificant effect on the slip improvement of the ethylene interpolymers described supra, when used alone. Therefore, the effect produced by the combination of these amphipathic compounds and this form of silica on the slip properties of these ethylene interpolymers is truly synergistic.

The invention is further described by the examples which follow in which parts and percentages are by weight unless otherwise specified.

Example 1

Master batches of the resin compositions were prepared to afford various additive levels. The master batch used to formulate a test composition for an ethylene-acrylic acid interpolymer film containing 0.2% of each amphipathic compound and silica additives was prepared as follows. An ethylene-acrylic acid interpolymer containing about 13% by weight acrylic acid copolymerized therein and having a melt index of 5 dg./min. (395.2 grams) was fluxed on a 3″ x 6″ steam heated 2 roll mill using a front roll temperature of 220° F. and a rear roll temperature of 150° F. After complete fluxing of the ethylene-acrylic acid interpolymer 2.4 grams of stearyl erucamide and 2.4 grams of a synthetic amorphous silica having a pore size of about 80–250 A. (at least 99.0% $SiO_2$), a surface area of about 175 to 400 meters$^2$/g. and an average particle size of about 0.5 to 8.0 microns were mixed with the ethylene interpolymer on the mill. When complete mixing was achieved the interpolymer-additive mixture was sheeted off, cooled and granulated to yield a resin form suitable for melt extrusion. The interpolymer-additive mixture was kept in this form until immediately prior to extrusion into film form at which time 400 grams of the above described master batch which contains 0.6% by weight of each additive (stearyl erucamide and silica respectively) was blended with 800 grams of the same ethylene-acrylic acid interpolymer as described above thereby yielding an interpolymer-additive mixture containing 0.2% by weight of each additive. This interpolymer-additive mixture was immediately processed into a film by means of a small blown film line which employed a 1″ National Rubber Machine Corporation extruder having a metering screw conventionally used for polyethylene type resins and a 2″ Egan-type tubular die (0.022″ die gap). The process conditions used for the extrusion of film are shown in Table I.

TABLE I

Barrel temperature #1—250° F.
Barrel temperature #2—325° F.
Adapter temperature—325° F.
Die temperature—350° F.
Screw speed—32 r.p.m.
Head pressure—1,000 p.s.i.
Take-off speed—10 ft./min.
Flat width—6¼″
Film thickness—1¼ mils
Screw cooling—no
Air ring cooling of bubble—medium Anti-blocking and slip properties of the blown film of an ethylene-acrylic acid interpolymer containing 13% acrylic acid were determined using Syloid 85 as the synthetic amorphous silica component, N-stearyl erucamide as the amphipathic additive and compared with control films prepared in the same way from formulations lacking either or both additives. The data thus obtained are presented in Table II.

TABLE II.—COMPARATIVE SLIP AND ANTI-BLOCK PROPERTIES OF BLOWN FILM

| Example | Polymer | Additive, percent | | COF[2] | Blocking force,[1] grams |
|---|---|---|---|---|---|
| | | Amphipathic | Silica | | |
| 1 | [3] | [4] 0.2 | [5] 0.2 | 0.32 | 58 |
| Control A | [3] | 0.2 | None | 0.89 | >250 |
| Control B | [3] | None | [5] 0.2 | 0.70 | >250 |
| Control C | [3] | None | [6] 0.2 | 1.03 | >250 |
| Control D | [3] | 0.2 | [5] 0.2 | 0.89 | 110 |

[1] Measured on outside-outside surfaces of flattened extrusion tube aged at 50° C. and 0.2 p.s.i. for 24 hours.
[2] Coefficient of friction measured on outside-outside surfaces of flattened extrusion tube after 24 hours.
[3] Blown film of ethylene/acrylic acid interpolymer containing 13% by weight acrylic acid; melt index=5 dg./min.
[4] N-stearyl erucamide.
[5] Syloid 85 (trademark of Davison Chemical Co. for the synthetic amorphous silica having a surface area of about 250 meters²/g. and an average particle size of about 4 microns with 80%, 7 microns).
[6] Superfloss (trademark of Johns-Manville Co. for diatomaceous earth).

Example 2

Example 1 was repeated with the exception that an ethylene-acrylic acid interpolymer having about 4% by weight of acrylic acid interpolymerized therein and a melt index of 2 dg./min. was used. Anti-blocking and slip properties of the blown film were determined and compared with control films prepared in the same way from formulations lacking either an amphipathic compound, a synthetic amorphous silica or both. These data are delineated in Table III.

TABLE III.—COMPARATIVE SLIP AND ANTI-BLOCK PROPERTIES OF BLOWN FILM

| Example | Polymer | Additive, percent | | COF[2] | Blocking force,[1] grams |
|---|---|---|---|---|---|
| | | Amphipathic | Silica | | |
| 2 | [3] | [4] 0.1 | [5] 0.1 | 0.25 | 10 |
| Control E | [3] | [4] 0.1 | [6] 0.1 | 0.52 | 33 |
| Control F | [3] | None | [5] 0.1 | 0.56 | 56 |

[1] Measured on outside-outside surfaces of flattened extrusion tube aged at 50° C. and 0.2 p.s.i. for 24 hours.
[2] Coefficient of friction measured on outside-outside surfaces of flattened extrusion tube after 24 hours.
[3] Blown film of ethylene-acrylic acid interpolymer containing 4% acrylic acid; melt index=2 dg./min.
[4] N-stearyl erucamide.
[5] Syloid 85.
[6] Superfloss.

Example 3

Example 1 was repeated with the exception that 34% of the acrylic acid moieties of the ethylene-acrylic acid interpolymer were first neutralized with sodium hydroxide to afford an interpolymer sodium salt or ionomer and the resultant blend was converted to a biaxially oriented film instead of a blown film. Apparatus suitable for preparing biaxially oriented films are well known and biaxial stretching of the tubing produced can be effected by compressed gases, tubular orientation or flat film stretches employing tenter frames. The interpolymer salt films used in demonstrating this invention were made by a tubular orientation or "double bubble" process. The primary tubing was first formed by melt extrusion from the die, inflated by the admission of air, cooled, collapsed, and then reinflated to form an isolated bubble. The tubing was then advanced through a heating zone to raise the film to its draw temperature of 80–90° C. but below the crystalline melting point of the interpolymer salt, i.e. 100° C.

The slip properties of the biaxially oriented film vis a vis the controls are collated in Table IV.

TABLE IV.—COMPARATIVE SLIP PROPERTIES OF BIAXIALLY ORIENTED FILM

| Example | Polymer | Additive, percent | | COF[1] |
|---|---|---|---|---|
| | | Amphipathic | Silica | |
| 3 | [2] | [3] 0.3 | [4] 0.03 | 0.31 |
| Control G | [2] | [3] 0.3 | [5] 0.03 | 0.82 |
| Control H | [2] | [3] 0.3 | None | >2.0 |
| Control I | [2] | None | None | >2.0 |

[1] Coefficient of friction measured on outside-outside surfaces of flattened extrusion tube after 24 hours.
[2] Biaxially oriented film of ethylene-acrylic acid interpolymer containing 13% acrylic acid and having a melt index of 5 dg./min., 34% converted to Na salt.
[3] N-stearyl erucamide.
[4] Syloid 85.
[5] Superfloss.

Example 4

Example 1 was repeated except that the ethylene-acrylic acid interpolymer was replaced by an ethylene-vinyl acetate interpolymer containing 4% by weight of vinyl acetate interpolymerized therein and having a melt index of 0.8 dg./min. The resultant blown film obtained was compared with several controls as shown by the slip and anti-blocking data in Table V.

TABLE V.—COMPARATIVE SLIP AND ANTI-BLOCK PROPERTIES OF ETHYLENE-VINYL ACETATE INTERPOLYMER BLOWN FILMS

| Example | Polymer | Additive, percent | | COF[2] | Blocking force,[1] grams |
|---|---|---|---|---|---|
| | | Amphipathic | Silica | | |
| 4 | [3] | [4] 0.1 | [5] 0.1 | 0.27 | 8 |
| Control J | [3] | None | None | >2.0 | 172 |
| Control K | [3] | [4] 0.2 | None | 1.1 | 25 |
| Control L | [3] | [4] 0.1 | [6] 0.1 | 0.36 | 20 |

[1] Measured on outside-outside surfaces of flattened extrusion tube aged at 50° C. and 0.2 p.s.i. for 24 hours.
[2] Coefficient of friction measured on outside-outside surfaces of flattened extrusion tube after 24 hours.
[3] Blown film of ethylene-vinyl acetate interpolymer containing 4% vinyl acetate and melt index=0.8 dg./min.
[4] N-stearyl erucamide.
[5] Syloid 266 (trademark of Davison Chemical Co. for synthetic amorphous silica having a surface area of about 330 meters²/g. and an average particle size of about 1.5 microns).
[6] Superfloss.

Example 5

Example 1 was repeated with the exception that an ethylene-acrylic acid interpolymer having about 15% by weight of acrylic acid interpolymerized therein and a melt index of 54 dg./min. which was 24% converted to the Na salt was substituted for the ethylene-acrylic acid interpolymer. Slip and antiblocking properties of the blown film together with controls are shown in Table VI.

TABLE VI.—COMPARATIVE SLIP AND ANTI-BLOCKING PROPERTIES OF ETHYLENE-ACRYLIC ACID INTERPOLYMER BLOWN FILM

| Example | Polymer | Additive, percent | | COF[2] | Blocking force,[1] grams |
|---|---|---|---|---|---|
| | | Amphipathic | Silica | | |
| 5 | [3] | [4] 0.1 | [5] 0.1 | 0.25 | 26 |
| Control M | [3] | None | None | 1.05 | >250 |
| Control N | [3] | [4] 0.1 | [6] 0.1 | 0.52 | 58 |

[1] Measured on outside-outside surfaces of flattened extrusion tube aged at 50° C. and 0.2 p.s.i. for 24 hours.
[2] Coefficient of friction measured on outside-outside surfaces of flattened extrusion tube after 24 hours.
[3] Blown film of ethylene-acrylic acid interpolymer containing 4% acrylic acid; melt index=7 dg./min.
[4] N-stearyl erucamide.
[5] Syloid 72 (trademark of Davison Chemical Co. for synthetic amorphous silica having a surface area of about 370 meters²/g. and an average particle size of 4 microns with 80% less than 6.5 microns).
[6] Superfloss.

Examples 6–13

When Example 1 is repeated except that N-stearyl erucamide is replaced as the amphipathic additive by palmityl erucamide, arachidyl erucamide, behenyl erucamide, stearyl gadoleamide, arachidyl nervonamide, lignoceryl cetoleamide or behenyl nervonamide equivalent improvements in slip and anti-blocking properties are obtained.

Example 14

Example 1 was repeated with the exception that an ethylene-acrylic acid interpolymer having about 4% acrylic acid interpolymerized and a melt index of 6 dg./min. was used together with 0.1% of Syloid 161 (trademark of Davison Chemical Co. for synthetic amorphous silica having a surface area of about 175 meters²/g. and an average particle size of about 7 microns). The amphipathic additive was 0.2% of N-stearyl erucamide. The coefficient of friction measured on outside-outside surfaces of flattened extrusion tube after 24 hours was 0.14. Anti-blocking properties similar to those obtained in Example 1 were also obtained.

Although the invention has been described in its preferred form with a certain amount of particularity, it is understood that the present disclosure has been made only by way of example, and that numerous changes can be made without departing from the spirit and scope of the invention.

What is claimed is:

1. The composition comprising:
   (a) at least one of the ethylene interpolymers selected from the class consisting of
      (1) ethylene-acrylic acid interpolymers containing from about 2 to 25% by weight of an acrylic acid copolymerized therein and having a melt index of about 0.01 to 350 dg./min.;
      (2) ethylene-methacrylic acid interpolymers containing from about 2 to 25% by weight of an acrylic acid copolymerized therein and having a melt index of about 0.01 to 350 dg./min.;
      (3) inorganic salts of said ethylene-acrylic acid or methacrylic acid interpolymers having about 10 to 100% by weight of the carboxyl groups of the acrylic acid moieties converted to acrylate salt moieties containing cations selected from the group consisting of alkali metal, alkaline earth and zinc cations; and
      (4) ethylene-vinyl acetate interpolymers containing from about 0.5 to 20% by weight of vinyl acetate interpolymerized therein and having a melt index of about 0.06 to 20 dg./min.;
   (b) from about 0.02 to 1% by weight based on the weight of the total composition of an N-substituted fatty acid amide represented by the formula

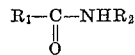

wherein $R_1$ is an ethylenically unsaturated hydrocarbon radical having from about 20 to 24 carbon atoms and $R_2$ is a saturated alkyl group having from about 14 to 26 carbon atoms; and
   (c) from about 0.01 to 2.0% by weight of the total composition of synthetic amorphous silica having a surface area of about 175 to 400 meters²/g. and an average particle size of about 0.5 to 8.0 microns.

2. Composition claimed in claim 1 wherein the fatty acid amide is stearyl erucamide.

3. Composition claimed in claim 2 wherein the ethylene interpolymer is an ethylene-acrylic acid interpolymer.

4. Composition claimed in claim 2 wherein the ethylene interpolymer is an ethylene-methacrylic acid interpolymer.

5. Composition claimed in claim 2 wherein the ethylene interpolymer is a sodium salt of ethylene-acrylic acid interpolymer.

6. Composition claimed in claim 2 wherein the ethylene interpolymer is a sodium salt of ethylene-methacrylic acid interpolymer.

7. Composition claimed in claim 2 wherein the ethylene interpolymer is an ethylene-vinyl acetate interpolymer.

8. Composition claimed in claim 1 wherein the fatty acid is behenyl erucamide.

9. Composition claimed in claim 1 wherein the fatty acid amide is palmityl erucamide.

10. Composition claimed in claim 2 wherein the ethylene interpolymer is a potassium salt of ethylene-acrylic acid interpolymer.

References Cited
UNITED STATES PATENTS

| | | | |
|---|---|---|---|
| 2,991,265 | 7/1961 | Clark et al. | 260—32.6 |
| 3,324,060 | 6/1967 | Scopp et al. | 260—23 |
| 3,463,751 | 8/1969 | Hasegawa et al. | 260—23 |
| 3,470,122 | 9/1969 | Ridgeway et al. | 260—23 |

ALLAN LIEBERMAN, Primary Examiner

J. H. DERRINGTON, Assistant Examiner

U.S. Cl. X.R.

260—41